(12) United States Patent
Xiang (10) Patent No.: US 10,547,950 B2
(45) Date of Patent: Jan. 28, 2020

(54) MOBILE TERMINAL AND CONTROL METHOD THEREOF, STORAGE MEDIUM

(71) Applicant: BEIJING XIAOMI MOBILE SOFTWARE CO., LTD., Beijing (CN)

(72) Inventor: Diyun Xiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/217,519

(22) Filed: Dec. 12, 2018

(65) Prior Publication Data

US 2019/0182603 A1  Jun. 13, 2019

(30) Foreign Application Priority Data

Dec. 13, 2017 (CN) .......................... 2017 1 1324367

(51) Int. Cl.
*H04R 17/00* (2006.01)
*H04R 1/02* (2006.01)
(Continued)

(52) U.S. Cl.
CPC ............ *H04R 17/00* (2013.01); *G10K 9/122* (2013.01); *G10K 9/125* (2013.01); *H04M 1/03* (2013.01);
(Continued)

(58) Field of Classification Search
CPC ...... H04R 17/00; H04R 3/00; H04R 2499/11; H04R 2499/15; H04R 7/045; G10K 9/122; G10K 9/125; H04M 1/03; H04M 1/605
(Continued)

(56) References Cited

U.S. PATENT DOCUMENTS 8,891,782 B2* 11/2014 Kim ...................... H04R 1/323
381/59
9,674,330 B2* 6/2017 Wang .................. H04M 1/6041
(Continued)

FOREIGN PATENT DOCUMENTS

CN 105554658 A 5/2016
CN 106255022 A 12/2016
(Continued)

OTHER PUBLICATIONS

International Search Report in PCT/2018/082532 dated Sep. 6, 2018.
(Continued)

*Primary Examiner* — Disler Paul
(74) *Attorney, Agent, or Firm* — Syncoda LLC; Feng Ma (57) ABSTRACT

A mobile terminal includes: a controller, and a piezoelectric excitation portion including a first excitation source, and a second excitation source surrounding the first excitation source, wherein: the controller is configured to control the first excitation source to generate a first vibration driving force and control the second excitation source to generate a second vibration driving force when the mobile terminal is in a handset mode, such that at a position where the second excitation source is located, a first vibration wave generated by the first vibration driving force and a second vibration wave generated by the second vibration driving force have opposite vibration directions, and a vibration amplitude of the second vibration wave is less than or equal to that of the first vibration wave.

19 Claims, 5 Drawing Sheets

(51) Int. Cl.
  *H04R 3/00* (2006.01)
  *H04R 7/04* (2006.01)
  *G10K 9/122* (2006.01)
  *H04M 1/03* (2006.01)
  *G10K 9/125* (2006.01)
  *H04M 1/60* (2006.01)

(52) U.S. Cl.
  CPC ............ *H04M 1/605* (2013.01); *H04R 1/025* (2013.01); *H04R 3/00* (2013.01); *H04R 7/045* (2013.01); *H04R 17/005* (2013.01); *H04R 2400/03* (2013.01); *H04R 2430/01* (2013.01); *H04R 2440/05* (2013.01); *H04R 2499/11* (2013.01); *H04S 2400/13* (2013.01)

(58) Field of Classification Search
  USPC ......................................................... 381/111
  See application file for complete search history.

(56) References Cited

U.S. PATENT DOCUMENTS

| | | | | |
|---|---|---|---|---|
| 2003/0003945 | A1* | 1/2003 | Saiki | H04M 1/03 455/550.1 |
| 2010/0054492 | A1* | 3/2010 | Eaton | H04R 3/12 381/74 |
| 2010/0194238 | A1* | 8/2010 | Frick | H02N 2/06 310/317 |
| 2015/0030189 | A1 | 1/2015 | Nabata et al. | |
| 2015/0086055 | A1* | 3/2015 | Kato | H04M 1/605 381/334 |
| 2016/0150323 | A1* | 5/2016 | Yan | H04M 1/03 381/123 |
| 2016/0329041 | A1* | 11/2016 | Qi | H04R 1/2811 |

FOREIGN PATENT DOCUMENTS

| | | |
|---|---|---|
| CN | 206559644 U | 10/2017 |
| CN | 107371109 A | 11/2017 |
| EP | 1507438 A2 | 2/2005 |
| EP | 2947857 A2 | 11/2015 |
| KR | 20050014748 A | 2/2005 |
| KR | 20150133918 A | 12/2015 |
| RU | 88888 U1 | 11/2009 |
| WO | 2014164018 A1 | 10/2014 |

OTHER PUBLICATIONS

Extended European Search Report in EP 18212386.9-1216 dated Feb. 1, 2019.

* cited by examiner

After a trigger instruction of the sound output mode is received, entering a sound output mode is, the sound output mode including a handset mode or a loudspeaker mode 302 When the mobile terminal is in a handset mode, controlling the first excitation source to emit a first vibration driving force and controlling the second excitation source to emit a second vibration driving force, so that at a position where the second excitation source is located, a first vibration wave generated by the first vibration driving force and a second vibration wave generated by the second vibration driving force have opposite vibration directions, and a vibration amplitude of the second vibration wave is less than or equal to that of the first vibration wave  —— 301

When the mobile terminal is in a handset mode, controlling the first excitation source to emit a first vibration driving force and controlling the second excitation source to emit a second vibration driving force, so that at a position where the second excitation source is located, a first vibration wave generated by the first vibration driving force and a second vibration wave generated by the second vibration driving force have opposite vibration directions, and a vibration amplitude of the second vibration wave is less than or equal to that of the first vibration wave  —— 302

When the mobile terminal is in a loudspeaker mode, controlling the first excitation source to emit a third vibration driving force and controlling the second excitation source to emit a fourth vibration driving force, so that at a position where the second excitation source is located, a third vibration wave generated by the third vibration driving force and a fourth vibration wave generated by the fourth vibration driving force have an identical vibration direction  —— 303

MOBILE TERMINAL AND CONTROL METHOD THEREOF, STORAGE MEDIUM

CROSS-REFERENCE TO RELATED APPLICATIONS

This application claims priority to Chinese Patent Application No. 201711324367.9, filed on Dec. 13, 2017, the disclosure of which is hereby incorporated by reference in its entirety.

BACKGROUND

Currently, in order to increase a screen occupation ratio of a mobile terminal (i.e., a percentage of a display screen area of the mobile terminal occupied in an area of the front surface of the mobile terminal), it has been proposed in most mobile terminals to adopt a narrow frame design or even a frameless design for display screens.

In a conventional handset technology of generating sound, such as by vibrations of a handset, it is required to leave a corresponding position for the handset on the display screen, which may affect the screen occupation ratio of the mobile terminal. Therefore, this technology is gradually replaced by a piezoelectric screen technology, such as a piezoelectric actuator technology, where it does not need to occupy the display area of the display screen.

In the piezoelectric display screen technology, a voltage signal is transformed into a mechanical energy through a piezoelectric ceramic, and a component (such as a display screen or a middle frame) attached to the piezoelectric ceramic is brought to oscillate to generate a sound, thereby transmitting the sound to an ear.

SUMMARY

The present disclosure relates to the field of electronic technology applications, and in particular, to a mobile terminal, a control method thereof, and a storage medium.

Various embodiments of the present disclosure provide a mobile terminal, a control method thereof, and a storage medium, which may solve the problem of leakage of the sound.

According to a first aspect of embodiments of the present disclosure, there is provided a mobile terminal, including: a housing, a controller, and a piezoelectric excitation portion disposed inside the housing, the piezoelectric excitation portion can produce a piezoelectric effect, the piezoelectric excitation portion including: a first excitation source and a second excitation source surrounding the first excitation source, wherein the controller is configured to control the first excitation source to generate a first vibration driving force and control the second excitation source to generate a second vibration driving force when the mobile terminal is in a handset mode, so that at a position where the second excitation source is located, a first vibration wave generated by the first vibration driving force and a second vibration wave generated by the second vibration driving force have opposite vibration directions, and a vibration amplitude of the second vibration wave is less than or equal to that of the first vibration wave.

In some embodiments, the controller is further configured to control the first excitation source to generate a third vibration driving force and control the second excitation source to generate a fourth vibration driving force when the mobile terminal is in a loudspeaker mode, so that at a position where the second excitation source is located, a third vibration wave generated by the third vibration driving force and a fourth vibration wave generated by the fourth vibration driving force have a same vibration direction.

In some embodiments, the second excitation source includes a plurality of excitation elements arranged at intervals, and an arrangement trajectory of the plurality of excitation elements is a circle centered on a geometric center of the first excitation source.

In some embodiments, each of the plurality of excitation elements is a stripe structure, and an extending direction of each of the excitation elements is collinear with the circle.

In some embodiments, the first excitation source is circular or rectangular.

In some embodiments, a display screen is disposed on the housing, and the piezoelectric excitation portion is disposed on a side of the display screen towards an interior of the housing; or a middle frame is disposed in the housing, and the piezoelectric excitation portion is disposed on the middle frame.

In some embodiments, the mobile terminal further includes: a first signal generator, a first voltage amplifier, a second signal generator and a second voltage amplifier, the controller, the first signal generator, the first voltage amplifier and the first excitation source are connected in sequence, and the controller, the second signal generator, the second voltage amplifier and the second excitation source are connected in sequence.

In some embodiments, the piezoelectric excitation portion is made of a piezoelectric ceramic.

According to a second aspect of embodiments of the present disclosure, there is provided a method for controlling a mobile terminal, wherein the mobile terminal includes: a housing and a piezoelectric excitation portion disposed inside the housing, the piezoelectric excitation portion can produce a piezoelectric effect, the piezoelectric excitation portion including: a first excitation source and a second excitation source surrounding the first excitation source; the method includes:

when the mobile terminal is in a handset mode, controlling the first excitation source to generate a first vibration driving force and controlling the second excitation source to generate a second vibration driving force, so that at a position where the second excitation source is located, a first vibration wave generated by the first vibration driving force and a second vibration wave generated by the second vibration driving force have opposite vibration directions, and a vibration amplitude of the second vibration wave is less than or equal to that of the first vibration wave.

In some embodiments, the method further includes:

when the mobile terminal is in a loudspeaker mode, controlling the first excitation source to generate a third vibration driving force and controlling the second excitation source to generate a fourth vibration driving force, so that at a position where the second excitation source is located, a third vibration wave generated by the third vibration driving force and a fourth vibration wave generated by the fourth vibration driving force have a same vibration direction.

According to a third aspect of embodiments of the present disclosure, there is provided a mobile terminal, wherein the mobile terminal includes: a housing and a piezoelectric excitation portion disposed inside the housing, the piezoelectric excitation portion can produce a piezoelectric effect, the piezoelectric excitation portion including: a first excitation source and a second excitation source surrounding the first excitation source, wherein the mobile terminal further includes:

a processor; and a memory for storing instructions executable by the processor, wherein the processor is configured to perform:

when the mobile terminal is in a handset mode, controlling the first excitation source to generate a first vibration driving force and controlling the second excitation source to generate a second vibration driving force, so that at a position where the second excitation source is located, a first vibration wave generated by the first vibration driving force and a second vibration wave generated by the second vibration driving force have opposite vibration directions, and a vibration amplitude of the second vibration wave is less than or equal to that of the first vibration wave.

According to a fourth aspect of embodiments of the present disclosure, there is provided a storage medium, having instructions stored therein, configured to, when executed on a processing component, cause the processing component to perform the method for controlling a mobile terminal according to the second aspect.

Various embodiments of the present disclosure can have one or more of the following advantages.

Through a mobile terminal, a control method thereof, and a storage medium provided by embodiments of the present disclosure, when the mobile terminal is in a handset mode, by controlling the first excitation source to generate a first vibration driving force and the second excitation source to generate a second vibration driving force, a first vibration wave generated by the first vibration driving force and a second vibration wave generated by the second vibration driving force cancel out each other at a position where the second excitation source is located, which suppresses or even prevents the first vibration wave from continuing to propagate, thereby reducing a vibration area of the mobile terminal and reducing the leakage of sound.

It is to be understood that, both the foregoing general description and the following detailed description describe only some embodiments by way of example, and are not restrictive of the present disclosure.

BRIEF DESCRIPTION OF THE DRAWINGS

In order to clearly illustrate the various embodiments provided in the present disclosure, the following are drawings that accompany the description of the embodiments.

It is noted that these drawings shall be interpreted to serve illustrating purposes only, and that these drawings may represent just some, but not all, of embodiments of the present disclosure. For those skilled in the art, other embodiments that are based on the structures as described below and illustrated in these drawings may become obvious. As such, these other embodiments shall be interpreted to be contained within the scope of the disclosure.

FIG. 3 is a flowchart of a method for controlling a mobile terminal according to some embodiments.

DETAILED DESCRIPTION

Descriptions will now be made in detail with respect to some embodiments, examples of which are illustrated in the accompanying drawings. The following description refers to the accompanying drawings in which the same numbers in different drawings may represent the same or similar elements unless otherwise represented. The implementations set forth in the following description of example embodiments do not represent all implementations consistent with the disclosure. Instead, they are merely examples of devices and methods consistent with aspects related to the disclosure as recited in the appended claims.

Figure 1A:
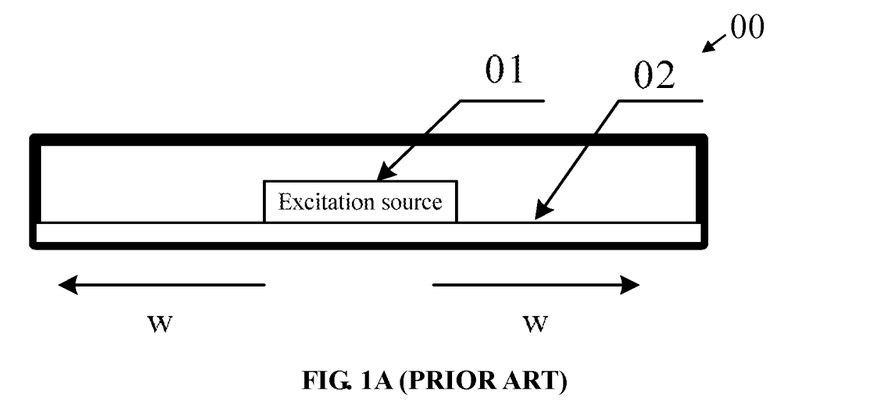
FIG. 1A is a schematic cross-sectional view of a conventional mobile terminal.

FIG. 1A is a schematic cross-sectional view of a conventional mobile terminal. The mobile terminal 00 includes an excitation source 01. The excitation source may be a piezoelectric ceramic. The excitation source 01 may be disposed inside a display screen or on a middle frame of a mobile terminal. FIG. 1A shows a scene in which the excitation source 01 is disposed inside the display screen 02 of the mobile terminal 00.

As shown in FIG. 1A, in the mobile terminal 00, when a voltage signal is applied to the excitation source 01, the excitation source 01 will generate a vibration driving force according to the voltage signal. A vibration wave generated by the vibration driving force will propagate outwardly all through by taking the excitation source 01 as a center. The propagation direction may be the propagation direction w in FIG. 1A. Under the action of the vibration driving force, the excitation source 01 drives the display screen 02 to vibrate together. The vibration also drives the air near the display screen to vibrate together, thus generating sound.

The inventors of the present disclosure have recognized, in the piezoelectric screen technology of generating sound, when the sound is output through the piezoelectric ceramic, the component attached to the piezoelectric ceramic will also vibrate in a large area, which leads to the problem of leakage of the sound.

Specifically, the sound has a characteristic of deflection (e.g., diffraction), that is, the sound can bypass obstacles during the propagation process. Therefore, when the vibration wave generated by the excitation source 01 propagates to an edge of a component (such as a display screen or a middle frame) where the excitation source 01 is provided, the sound generated by the vibration of the air around the component caused by the vibration wave will bypass the component and continue to spread, which leads to the phenomenon of sound leakage.

Figure 1B:
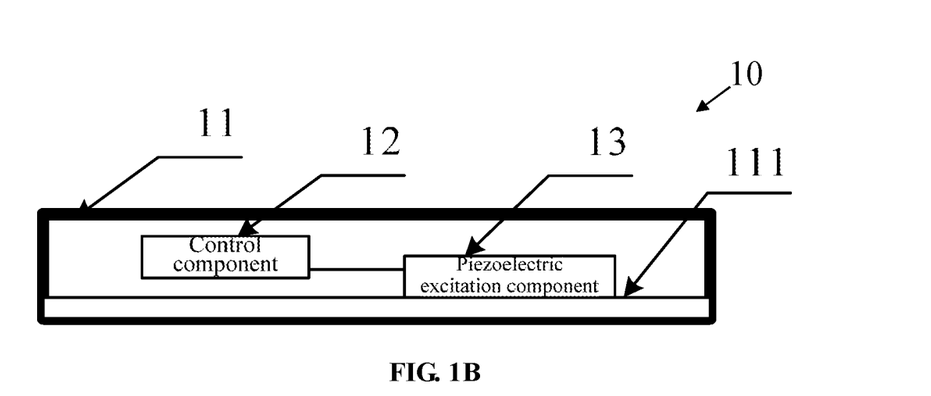
FIG. 1B is a schematic structural diagram of a mobile terminal according to some embodiments.

As shown in FIG. 1B, an embodiment of the present disclosure provides a mobile terminal 10. The mobile terminal 10 may be a device such as a mobile phone or a tablet computer that has a function of calling or playing audio. The mobile terminal 10 includes: a housing 11, a controller 12, and a piezoelectric excitation portion 13 disposed inside the housing 11. The control unit 12 is connected to the piezoelectric excitation portion 13.

In some embodiments, a display screen is disposed on the housing, and the piezoelectric excitation portion may be disposed on a side of the display screen towards an interior of the housing, i.e., an inner side of the display screen. Alternatively, a middle frame is disposed in the housing, and the piezoelectric excitation portion is disposed on the middle frame. In some embodiments, the housing may be composed of a front cover, a middle frame, and a rear cover, and the display screen is disposed on the front cover. Alternatively, the housing may be composed of a front cover and a middle frame, and the display screen is disposed on the front cover. Alternatively, the housing may be composed of a middle frame and a rear cover, and the display screen is disposed on the middle frame (at this time, the mobile terminal is a full-screen mobile terminal). Alternatively, the housing may be composed of a middle frame, and the display screen is disposed on the middle frame (at this time, the mobile terminal is a full-screen mobile terminal). The embodiment of the present disclosure does not limit this. The scenario shown in FIG. 1B is a scene where the piezoelectric excitation portion 13 is disposed on the display screen 111 in the housing 11.

Figure 1C:
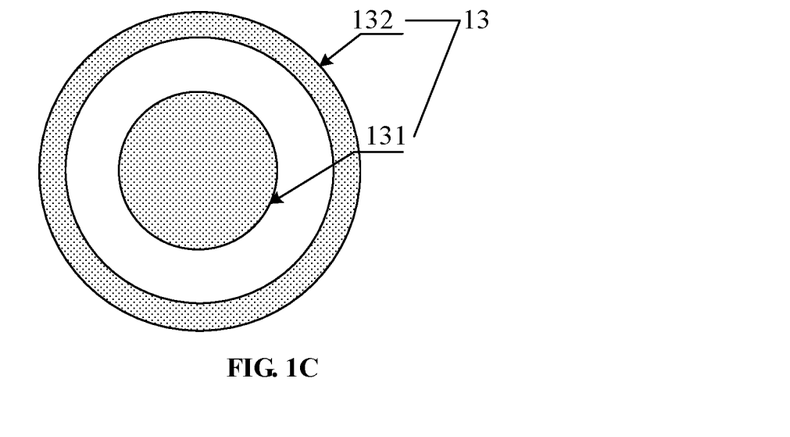
FIG. 1C is a schematic structural diagram of a piezoelectric excitation portion according to some embodiments.

FIG. 1C is a schematic structural diagram of a piezoelectric excitation portion 13 according to some embodiments. The piezoelectric excitation portion 13 may include: a first excitation source 131 and a second excitation source 132 surrounding the first excitation source 131.

The piezoelectric excitation portion 13 is made of a piezoelectric material, which is a material that can realize the mutual conversion of mechanical energy and electric energy. The piezoelectric material can generate a piezoelectric effect, and the piezoelectric effect includes an inverse piezoelectric effect. The inverse piezoelectric effect means that when a voltage signal is applied to a surface of the piezoelectric material, the voltage signal will excite the piezoelectric material to generate a driving force to deform the piezoelectric material. This process converts electrical energy into mechanical energy. In the embodiment of the present disclosure, the piezoelectric material of the piezoelectric excitation portion 13 is mainly used to achieve the above inverse piezoelectric effect. In some embodiments, the piezoelectric material may include an inorganic piezoelectric material (for example, a piezoelectric crystal or a piezoelectric ceramic) or an organic piezoelectric material (for example, a piezoelectric polymer).

The piezoelectric excitation portion can be used to implement the function of the mobile terminal to output sound, and its function is similar to a handset or a loudspeaker. The mobile terminal provided in the embodiment of the present disclosure has two sound output modes, namely a handset mode and a loudspeaker mode. The handset mode may also be referred to as a hand-held call mode, in which the mobile terminal outputs sound in a first range through the piezoelectric excitation portion. The loudspeaker mode is a mode in which the mobile terminal outputs sound in a second range through the piezoelectric excitation portion. The first range is smaller than the second range, and a volume of the sound output by the handset mode is generally lower than that of the sound output by the loudspeaker mode. The handset mode is more private than the loudspeaker mode.

Referring to both FIGS. 1B and 1C, the controller 12 may be one or more CPUs or control chips and is configured to control the first excitation source 131 to generate a first vibration driving force and control the second excitation source 132 to generate a second vibration driving force when the mobile terminal 10 is in a handset mode, so that at a position where the second excitation source 132 is located, a first vibration wave generated by the first vibration driving force and a second vibration wave generated by the second vibration driving force have opposite vibration directions, and a vibration amplitude of the second vibration wave is less than or equal to that of the first vibration wave.

Figure 1D:
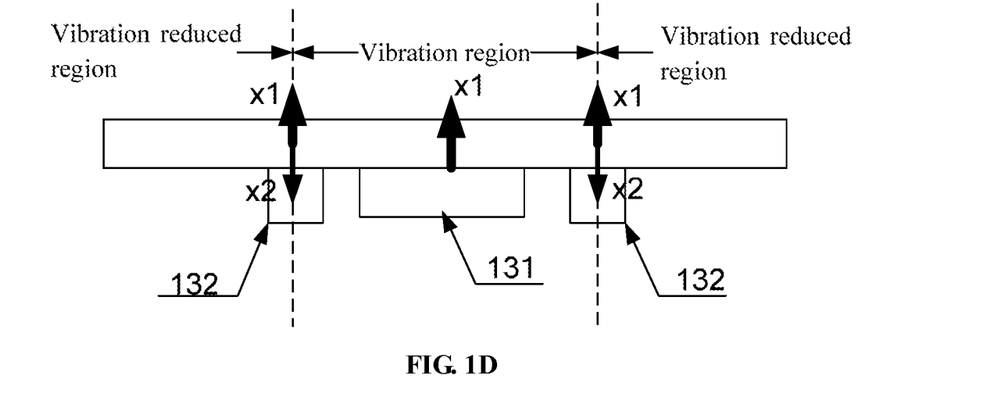
FIG. 1D is a schematic diagram of an operating principle of a piezoelectric excitation portion according to some embodiments.

As shown in FIG. 1D, at the position where the second excitation source 132 is located, vibration amplitudes of two vibration waves, i.e., the first vibration wave $x1$ and the second vibration wave $x2$ (only vibration directions of the two vibration waves are shown in FIG. 1D) may be algebraically superimposed. When the vibration amplitude of the second vibration wave $x2$ is smaller than that of the first vibration wave $x1$, the second vibration wave can cancel out a part of the first vibration wave, thereby further suppressing the propagation effect of the first vibration wave. Further, when the vibration amplitude of the second vibration wave is equal to that of the first vibration wave, the second vibration wave can completely cancel out the first vibration wave at the position where the second excitation source 132 is located, thereby further preventing the propagation of the first vibration wave.

As shown in FIG. 1D, a vibration region exists in a region surrounded by the second excitation source 132, to ensure that the sound is normally transmitted to the human ear in the handset mode. Outside the region surrounded by the second excitation source 132, the second vibration wave suppresses or cancels out the first vibration wave to form a vibration reduced region. Therefore, when the second vibration wave cancels out a part of the first vibration wave, a vibration intensity of the vibration wave transmitted on the vibration reduced region is much smaller than that of the first vibration wave; and when the second vibration wave completely cancels out the first vibration wave, the second excitation source 132 forms a baffle, which can completely block the transmission of the first vibration wave, and the vibration reduced region can be a non-vibration region, that is, there is no transmission of the vibration wave.

The scene where the second vibration wave suppresses or prevents the propagation of the first vibration wave described above can reduce the vibration wave that propagates to the edge of the component where the piezoelectric excitation portion is located (for example, in FIG. 1B, the vibration wave propagating to the edge of the display screen 111 can be reduced), which in turn reduces the diffraction phenomenon of the sound, thereby reducing the phenomenon of sound leakage. In this way, the privacy of the call in the handset mode is kept.

It should be noted that, in FIG. 1D, for example, at the position where the first excitation source 131 is located, an initial vibration direction of the first vibration wave is outward vertical to the display screen (i.e., a upward direction in FIG. 1D), and a vibration direction of the first vibration wave propagating to the position where the second excitation source 132 is located is also outward vertical to the display screen. In practical applications, no matter the initial vibration direction of the first vibration wave and the vibration direction of propagating to the second excitation source is inward vertical to the display screen or outward vertical to the display screen, as long as the vibration direction thereof is opposite to the vibration direction of the second vibration wave when the first vibration wave propagates to the position where the second excitation source 132 is located. Therefore, the embodiment of the present disclosure does not limit the initial vibration direction of the first vibration wave and the direction of vibration at the second excitation source.

Therefore, through the mobile terminal provided in the embodiment of the present disclosure, when the mobile terminal is in the handset mode, the first excitation source and the second excitation source are controlled, so that the vibration waves emitted by them two cancel out each other at the position where the second excitation source is located, which suppresses or even prevents the continued propagation of the first vibration wave emitted from the first excitation source, in turn reduces the vibration area of the mobile terminal and reduces the phenomenon of sound leakage.

Compared with the handset mode, the sound output by the mobile terminal in the loudspeaker mode mainly needs to consider the volume and propagation range of the sound, without considering the sound leakage problem. Therefore, the controller can control the vibration wave generated by the second excitation source to promote the transmission of the vibration wave generated by the first excitation source.

The controller may be further configured to control the first excitation source 131 to generate a third vibration driving force and control the second excitation source 132 to generate a fourth vibration driving force when the mobile terminal is in a loudspeaker mode, so that at a position where the second excitation source 132 is located, a third vibration wave generated by the third vibration driving force and a fourth vibration wave generated by the fourth vibration driving force have a same vibration direction.

Figure 1E:
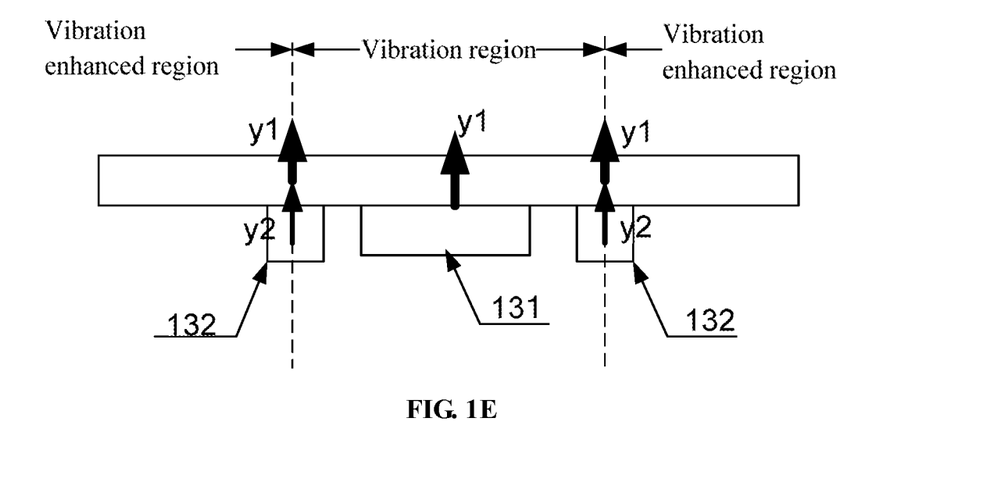
FIG. 1E is another schematic diagram of an operating principle of a piezoelectric excitation portion according to some embodiments.

As shown in FIG. 1E, at the position where the second excitation source 132 is located, vibration amplitudes of two vibration waves, i.e., the third vibration wave y1 and the fourth vibration wave y2 (only vibration directions of the two vibration waves are shown in FIG. 1E) may be algebraically superimposed. When the vibration direction of the fourth vibration wave y1 is the same as that of the third vibration wave y2, the superposition of them two promotes the transmission of the third vibration wave, thereby enhancing the vibration amplitude of the air and the diffraction of the sound. In this way, the intensity of sound output from the mobile terminal is stronger and the range is wider, which improves the loudspeaker effect of the sound. As shown in FIG. 1E, a vibration region exists in a region surrounded by the second excitation source 132. Outside the region surrounded by the second excitation source 132, the second vibration wave promotes the first vibration wave to form a vibration enhanced region, and thus the sound generated in the vibration enhanced region has a wider sound propagation range and a higher volume.

It should be noted that, in FIG. 1E, for example, at the position where the first excitation source 131 is located, an initial vibration direction of the third vibration wave is outward vertical to the display screen (i.e., a upward direction in FIG. 1E), and a vibration direction of the third vibration wave propagating to the position where the second excitation source 132 is located is also outward vertical to the display screen. In practical applications, no matter the initial vibration direction of the third vibration wave and the vibration direction of propagating to the second excitation source is inward vertical to the display screen or outward vertical to the display screen, as long as the vibration direction thereof is opposite to the vibration direction of the fourth vibration wave when the third vibration wave propagates to the position where the second excitation source 132 is located. Therefore, the embodiment of the present disclosure does not limit the initial vibration direction of the third vibration wave and the direction of vibration at the second excitation source.

Figure 2A:
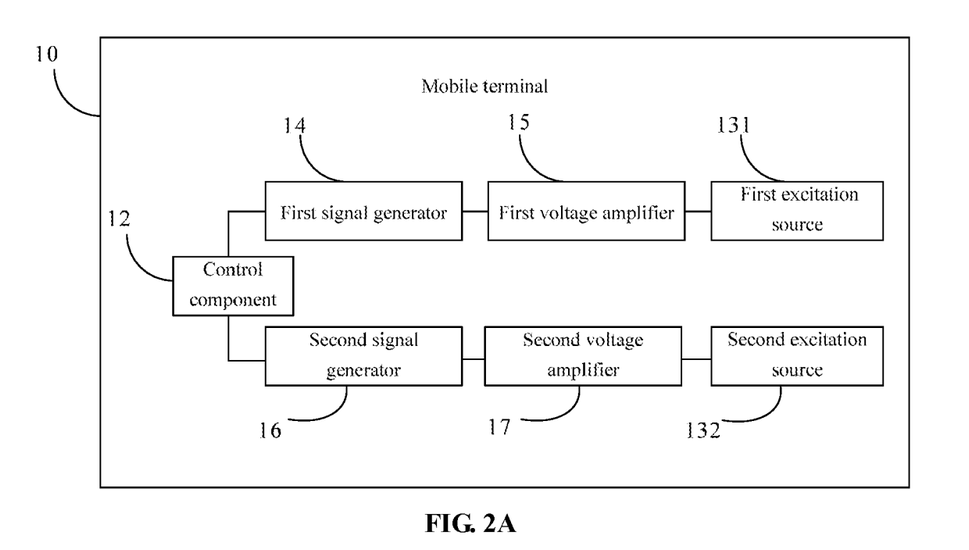
FIG. 2A is another schematic structural diagram of a mobile terminal according to some embodiments.

In some implementations, as shown in FIG. 2A, the mobile terminal 10 may further include a first signal generator 14, a first voltage amplifier 15, a second signal generator 16, and a second voltage amplifier 17.

In the embodiments, the controller 12, the first signal generator 14, the first voltage amplifier 15 and the first excitation source 131 are connected in sequence to form a first path, and the controller 12, the second signal generator 16, the second voltage amplifier 17 and the second excitation source 132 are connected in sequence to form a second path.

When the mobile terminal is in the sound output mode (such as the handset mode or the loudspeaker mode), as for the first path, the controller 12 generates a first digital signal based on the audio data (such as the audio data to be played or the call data during the call) acquired by the mobile terminal 10 and transmits the first digital signal to a first signal generator 14. The first signal generator 14 generates a first voltage signal based on the first digital signal and transmits the first voltage signal to the first voltage amplifier 15. The first voltage amplifier 15 amplifies the first voltage signal and transmits the amplified first voltage signal to the first excitation source 131. After the first excitation source 131 receives the amplified first voltage signal, a corresponding vibration driving force is generated according to the amplified first voltage signal under the action of the inverse piezoelectric effect.

As for the second path, similar to the transmission process of the first path, the controller 12 generates a second digital signal based on the audio data acquired by the mobile terminal 10 and transmits the second digital signal to a second signal generator 16. The second signal generator 16 generates a second voltage signal based on the second digital signal and transmits the second voltage signal to the second voltage amplifier 17. The second voltage amplifier 17 amplifies the second voltage signal and transmits the amplified second voltage signal to the second excitation source 132. After the second excitation source 132 receives the amplified second voltage signal, a corresponding vibration driving force is generated according to the amplified second voltage signal under the action of the inverse piezoelectric effect.

It should be noted that, under the same sound output mode, actions of the above first path and second path are synchronized and the above audio data is the same data. When the sound output mode is the handset mode, the vibration driving force generated by the first excitation source 131 is the above first vibration driving force, and the vibration driving force generated by the second excitation source 132 is the above second vibration driving force. When the sound output mode is the loudspeaker mode, the vibration driving force generated by the first excitation source 131 is the above third vibration driving force, and the vibration driving force generated by the second excitation source 132 is the above fourth vibration driving force.

In some implementations, the above controller may include two sub-controllers, which are connected to the first signal generator and the second signal generator in one-to-one correspondence. Any solution obtained by simply modifying the solution provided by the present disclosure should be covered within the protection scope of the present disclosure, and embodiments of the present disclosure are not limited thereto.

Figure 2B:
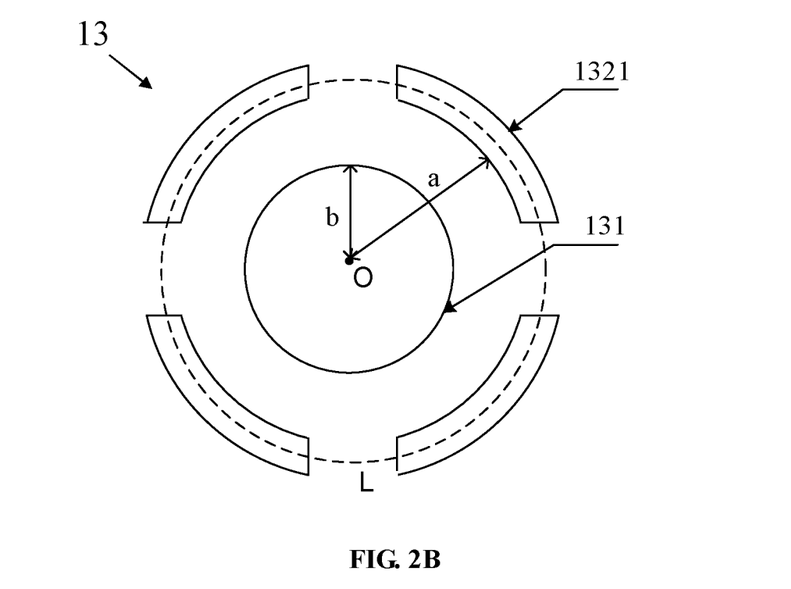
FIG. 2B is another schematic structural diagram of a piezoelectric excitation portion according to some embodiments.

In order to describe the operating process of the piezoelectric excitation portion 13 more clearly, FIG. 2B is provided, which illustrates a schematic structural diagram of another piezoelectric excitation portion 13. In order to ensure that vibration waves generated by the first excitation source 131 under the vibration driving force uniformly propagate to the surrounding, the above first excitation source 131 may have a circular shape or a rectangular shape. The rectangular shape may be a rectangle or a square (in implementations, it may also have other shapes, such as an ellipse or other irregular shape, which is not limited by the embodiment of the present disclosure), and it is set at the geometric center position of the display screen or middle frame. The second excitation source is disposed around the first excitation source 131. A shape of the second excitation source may be a closed annular shape as shown in FIG. 1C.

Alternatively, the second excitation source may also include a plurality of excitation elements 1321 arranged at intervals. FIG. 2B is a schematic structural view of the second excitation source including four excitation elements 1321 arranged at intervals. As shown in FIG. 2B, an arrangement trajectory of the plurality of excitation elements 1321 is a circle L centered on a geometric center 0 of the first excitation source. When the second excitation source is circularly distributed around the first excitation source 131, the vibration wave generated by the second excitation source may act uniformly on the vibration waves generated by the first excitation source 131.

For example, each of the plurality of excitation elements 1321 is a stripe structure, and an extending direction of each of the excitation elements 1321 is collinear with the circle L. In some implementations, the arrangement trajectories of the plurality of excitation elements 1321 may also be other shapes, such as elliptical, rectangular, or other irregular shapes, which is not limited in this embodiment of the present disclosure. In some embodiments, the shape of the arrangement trajectory and the shape of the first excitation source may be similar patterns with a common geometric center, and a width of the space therebetween is equal.

In some embodiments of the present disclosure, the first excitation source and the second excitation source are disposed at intervals. In some implementations, a gap size between the second excitation source and the first excitation source is positively correlated with a maximum sound output range of the mobile terminal (this range is usually a range of a circle centered on a geometric center of the first excitation source, and its radius is a maximum output radius of the sound). That is, the larger the gap therebetween is, the greater the maximum sound output range of the mobile terminal will be. Moreover, the size of the first excitation source is also positively correlated to the maximum sound output range of the mobile terminal. That is, the larger the size of the first excitation source is, the larger the maximum sound output range of the mobile terminal will be.

Therefore, when the mobile terminal is manufactured, if the mobile terminal needs to be able to maintain a relatively large sound output range, that is, the effect of the loudspeaker mode is better, the gap size between the second excitation source and the first excitation source can be set larger (that is, larger than a preset gap threshold) and/or the size of the first excitation source can be set larger (that is, larger than a preset size threshold); if the mobile terminal needs to be able to maintain a relatively small sound output range, that is, the effect of the handset mode is better, the gap size between the second excitation source and the first excitation source can be set smaller (that is, smaller than a preset gap threshold) and/or the size of the first excitation source can be set smaller (that is, smaller than a preset size threshold). The present disclosure is not limited thereto.

Referring to FIG. 2B, assuming that the radius of the first excitation source 131 is b mm and the radius of the inner ring of the second excitation source is a mm, then the size of a-b is the size of the gap. In this way, the larger the a is and/or the smaller the b is, the larger the maximum sound output range of the mobile terminal will be.

In some implementations, the propagation of the vibration wave is influenced by not only the shape of the first excitation source, the shape of the second excitation source, and the arrangement trajectory of the second excitation source, but also the material, size and thickness of the first excitation source and the material of the component where the first excitation source is disposed, and the like. For example, when the controller controls the first excitation source to generate the first vibration driving force, the greater the thickness of the first excitation source is, the smaller the first vibration driving force generated by the first excitation source will be, and correspondingly, the generated first vibration wave will be weaker. Therefore, when the above controller generates the first digital signal and the second digital signal, it is also necessary to consider the above factors. The present disclosure is not limited thereto.

Therefore, through the mobile terminal provided in the embodiment of the present disclosure, when the mobile terminal is in the handset mode, the first excitation source and the second excitation source are controlled, so that the vibration waves emitted by them two cancel out each other at the position where the second excitation source is located, which suppresses or even prevents the continued propagation of the first vibration wave emitted from the first excitation source, in turn reduces the vibration area of the mobile terminal and reduces the phenomenon of sound leakage.

Moreover, when the mobile terminal is in the loudspeaker mode, the first excitation source and the second excitation source are controlled, so that the vibration waves emitted by them two are enhanced at the position where the second excitation source is located, which promotes the continuous propagation of the third vibration wave emitted by the first excitation source. In turn, the intensity of the sound output by the mobile terminal is stronger, the scope is larger and the loudspeaker effect of the sound is improved.

Some embodiments of the present disclosure further provide a method for controlling a mobile terminal, for controlling the mobile terminal described in the above embodiments. The mobile terminal includes: a housing and a piezoelectric excitation portion disposed inside the housing, the piezoelectric excitation portion can produce a piezoelectric effect, the piezoelectric excitation portion including: a first excitation source and a second excitation source surrounding the first excitation source; the method for controlling a mobile terminal includes: when the mobile terminal is in a handset mode, controlling the first excitation source to generate a first vibration driving force and controlling the second excitation source to generate a second vibration driving force, so that at a position where the second excitation source is located, a first vibration wave generated by the first vibration driving force and a second vibration wave generated by the second vibration driving force have opposite vibration directions, and a vibration amplitude of the second vibration wave is less than or equal to that of the first vibration wave.

Therefore, through the method for controlling a mobile terminal provided in the embodiment of the present disclosure, when the mobile terminal is in the handset mode, the first excitation source and the second excitation source are controlled, so that the vibration waves emitted by them two cancel out each other at the position where the second excitation source is located, which suppresses or even prevents the continued propagation of the first vibration wave emitted from the first excitation source, in turn reduces the vibration area of the mobile terminal and reduces the phenomenon of sound leakage.

As shown in FIG. 3, some embodiments of the present disclosure provide a method for controlling a mobile terminal. The control method can include following steps.

Step 301: after a trigger instruction of the sound output mode is received, a sound output mode is entered, wherein the sound output mode includes a handset mode or a loudspeaker mode.

In the operation of the mobile terminal, when the user needs to make a call or an audio play through the mobile terminal, the user may trigger the mobile terminal to enter the sound output mode. The mobile terminal may provide a triggering manner of at least one sound output mode. For example, the mobile terminal may provide a physical or virtual trigger button. When the user clicks or presses the trigger button, the mobile terminal receives a corresponding trigger instruction and enters a sound output mode.

For example, after receiving a call instruction, the mobile terminal displays a call interface. The call interface includes trigger buttons of the handset mode and the loudspeaker mode. The mobile terminal enters a corresponding sound output mode according to the selection of the user.

Of course, after the mobile terminal enters a sound output mode, the mobile terminal can also adjust the sound output mode. For example, the mobile terminal may also set a position sensor. After the mobile terminal enters a certain sound output mode, the position sensor may detect a distance between a human face and a display screen of the mobile terminal. When the distance is less than a preset distance threshold, the mobile terminal enters the handset mode. When the distance is not less than the preset distance threshold, the mobile terminal enters the loudspeaker mode.

Step 302: when the mobile terminal is in a handset mode, the first excitation source is controlled to generate a first vibration driving force and the second excitation source is controlled to generate a second vibration driving force, so that at a position where the second excitation source is located, a first vibration wave generated by the first vibration driving force and a second vibration wave generated by the second vibration driving force have opposite vibration directions, and a vibration amplitude of the second vibration wave is less than or equal to that of the first vibration wave.

Step 303: when the mobile terminal is in a loudspeaker mode, the first excitation source is controlled to generate a third vibration driving force and the second excitation source is controlled to generate a fourth vibration driving force, so that at a position where the second excitation source is located, a third vibration wave generated by the third vibration driving force and a fourth vibration wave generated by the fourth vibration driving force have a same vibration direction.

For the implementation process of the aforesaid method, reference may be made to the content in the aforesaid apparatus embodiments, which is not limited in this embodiment of the present disclosure.

Therefore, through the method for controlling a mobile terminal provided in the embodiment of the present disclosure, when the mobile terminal is in the handset mode, the first excitation source and the second excitation source are controlled, so that the vibration waves emitted by them two cancel out each other at the position where the second excitation source is located, which suppresses or even prevents the continued propagation of the first vibration wave emitted from the first excitation source, in turn reduces the vibration area of the mobile terminal and reduces the phenomenon of sound leakage. Moreover, when the mobile terminal is in the loudspeaker mode, the first excitation source and the second excitation source are controlled, so that the vibration waves emitted by them two are enhanced at the position where the second excitation source is located, which promotes the continuous propagation of the third vibration wave emitted by the first excitation source. In turn, the intensity of the sound output by the mobile terminal is stronger, the scope is larger and the loudspeaker effect of the sound is improved.

Figure 4:
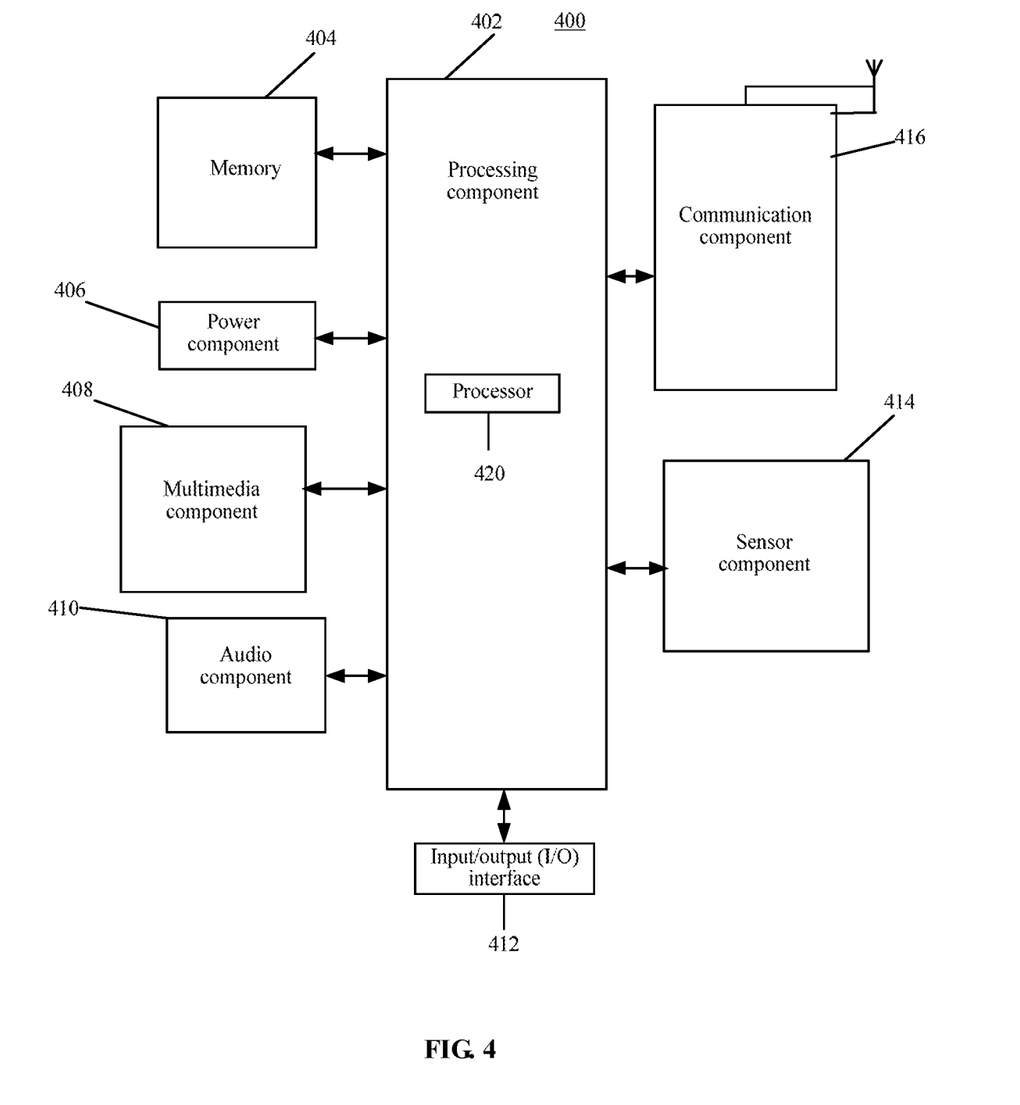
FIG. 4 is a block diagram of a mobile terminal according to some embodiments.

FIG. 4 is a block diagram of a mobile terminal 400 according to some embodiments. For example, the mobile terminal 400 may be a mobile phone, a digital broadcast terminal, a messaging device, a game console, a tablet device, a medical device, a fitness device, a personal digital assistant, and the like.

Referring to FIG. 4, the mobile terminal 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the mobile terminal 400, such as the operations associated with display, telephone calls, data communications, camera operations, and recording operations. The processing component 402 may be implemented with the controller 12 in the aforesaid embodiment, and may include one or more processors 420 to execute instructions to perform all or part of the steps in the above described methods. Moreover, the processing component 402 may be may include one or more modules which facilitate the interaction between the processing component 402 and other components. For instance, the processing component 402 may include a multimedia module to facilitate the interaction between the multimedia component 408 and the processing component 402.

The various device components, units, blocks, or portions may have modular configurations, or are composed of discrete components, but nonetheless may be referred to as "modules" in general. In other words, the "modules" or "units" referred to herein may or may not be in modular forms. Such modules, units, components, blocks, or portions may be realized with hardware, software, or a combination thereof.

The memory 404 is configured to store various types of data to support the operations of the mobile terminal 400. Examples of such data include instructions for any applications or methods operated on the mobile terminal 400, contact data, phonebook data, messages, pictures, video, etc. The memory 404 may be implemented by using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the mobile terminal 400. The power component 406 may include a power management system, one or more power sources, and any other components associated with the generation, management, and distribution of power in the mobile terminal 400.

The multimedia component 408 includes a screen providing an output interface between the mobile terminal 400 and the user. In embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In embodiments, the multimedia component 408 includes a front camera and/or a rear camera. The front camera and the rear camera may receive an external multimedia datum while the mobile terminal 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the mobile terminal 400 is in an operation mode, such as a call mode, a recording mode, and a sound recognition mode. The received audio signal may be further stored in the memory 404 or sent via the communication component 416. In embodiments of the present disclosure, the audio component 410 further includes a piezoelectric excitation portion 13 described above to output sound.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide state assessments of various aspects of the mobile terminal 400. For instance, the sensor component 414 may detect an open/closed state of the mobile terminal 400, relative positioning of components, e.g., the display and the keypad, of the mobile terminal 400, a change in position of the mobile terminal 400 or a component of the mobile terminal 400, a presence or absence of user contact with the mobile terminal 400, an orientation or an acceleration/deceleration of the mobile terminal 400, and a change in temperature of the mobile terminal 400. The sensor component 414 may include a proximity sensor configured to detect the presence of nearby objects without any physical contact. The sensor component 414 may further include a light sensor, such as a CMOS or CCD image sensor, for use in imaging applications. In embodiments, the sensor component 414 may further include an accelerometer sensor, a gyroscope sensor, a magnetic sensor, a pressure sensor or a temperature sensor.

The communication component 416 is configured to facilitate communication, wired or wirelessly, between the mobile terminal 400 and other devices. The mobile terminal 400 may access a wireless network based on a communication standard, such as WiFi, 2G; or 3G; or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the mobile terminal 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In some embodiments, there is further provided a non-transitory computer-readable storage medium including instructions, such as included in the memory 404, executable by the processor 420 in the mobile terminal 400, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium are executed by a processor of the mobile terminal 400, the mobile terminal 400 is enabled to perform the above method for controlling a mobile terminal. The control method includes: when the mobile terminal is in a handset mode, controlling the first excitation source to generate a first vibration driving force and controlling the second excitation source to generate a second vibration driving force, so that at a position where the second excitation source is located, a first vibration wave generated by the first vibration driving force and a second vibration wave generated by the second vibration driving force have opposite vibration directions, and a vibration amplitude of the second vibration wave is less than or equal to that of the first vibration wave.

In some embodiments, the control method further includes: when the mobile terminal is in a loudspeaker mode, controlling the first excitation source to generate a third vibration driving force and controlling the second excitation source to generate a fourth vibration driving force, so that at a position where the second excitation source is located, a third vibration wave generated by the third vibration driving force and a fourth vibration wave generated by the fourth vibration driving force have a same vibration direction.

In the descriptions, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "one implementation," "some embodiments," "some implementations," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a ROM, a RAM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA, or an ASIC. The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

The features disclosed herein may be implemented as part of a smart home or a smart office design, which may implement individually or integrally various electronic devices in a home or office. For example, control or display functions described above may be realized on a mobile terminal such as a smart phone, or on a smart television Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Therefore, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A mobile terminal, comprising: a controller, and a piezoelectric excitation portion including a first excitation source, and a second excitation source surrounding the first excitation source, wherein: the controller is configured to control the first excitation source to generate a first vibration driving force and control the second excitation source to generate a second vibration driving force responsive to the mobile terminal being in a handset mode, such that at a position where the second excitation source is located, a first vibration wave generated by the first vibration driving force and a second vibration wave generated by the second vibration driving force have opposite vibration directions, and a vibration amplitude of the second vibration wave is less than or equal to that of the first vibration wave; and the second excitation source comprises a plurality of excitation elements arranged at intervals, and an arrangement trajectory of the plurality of excitation elements is a circle centered on a geometric center of the first excitation source.

2. The mobile terminal according to claim 1, wherein the controller is further configured to control the first excitation source to generate a third vibration driving force and control the second excitation source to generate a fourth vibration driving force responsive to the mobile terminal being in a loudspeaker mode, such that at a position where the second excitation source is located, a third vibration wave generated by the third vibration driving force and a fourth vibration wave generated by the fourth vibration driving force have a same vibration direction.

3. The mobile terminal according to claim 2, wherein the second excitation source comprises a plurality of excitation elements arranged at intervals, and an arrangement trajectory of the plurality of excitation elements is a circle centered on a geometric center of the first excitation source.

4. The mobile terminal according to claim 3, wherein each of the plurality of excitation elements has a stripe structure, and an extending direction of each of the excitation elements is collinear with the circle.

5. The mobile terminal according to claim 4, wherein the first excitation source is circular or rectangular.

6. The mobile terminal according to claim 1, wherein each of the plurality of excitation elements has a stripe structure, and an extending direction of each of the plurality of excitation elements is collinear with the circle.

7. The mobile terminal according to claim 6, wherein the first excitation source is circular or rectangular.

8. The mobile terminal according to claim 1, further comprising:
a housing enclosing the controller and the piezoelectric excitation portion;
a display screen disposed on the housing; and
a middle frame is disposed in the housing.

9. The mobile terminal according to claim 8, wherein the piezoelectric excitation portion is disposed on a side of the display screen towards an interior of the housing.

10. The mobile terminal according to claim 8, wherein the piezoelectric excitation portion is disposed on the middle frame.

11. The mobile terminal according to claim 1, further comprising:
a first signal generator;
a first voltage amplifier;
a second signal generator; and
a second voltage amplifier,
wherein:
the controller, the first signal generator, the first voltage amplifier and the first excitation source are coupled in sequence; and
the controller, the second signal generator, the second voltage amplifier and the second excitation source are coupled in sequence.

12. The mobile terminal according to claim 1, wherein the piezoelectric excitation portion is made of a piezoelectric ceramic.

13. A method for controlling a mobile terminal comprising: a housing, and a piezoelectric excitation portion disposed inside the housing, wherein the piezoelectric excitation portion comprises: a first excitation source and a second excitation source surrounding the first excitation source; the method comprising: responsive to the mobile terminal being in a handset mode, controlling the first excitation source to generate a first vibration driving force and controlling the second excitation source to generate a second vibration driving force, such that at a position where the second excitation source is located, a first vibration wave generated by the first vibration driving force and a second vibration wave generated by the second vibration driving force have opposite vibration directions, and a vibration amplitude of the second vibration wave is less than or equal to that of the first vibration wave wherein; the second excitation source comprises a plurality of excitation elements arranged at intervals, and an arrangement trajectory of the plurality of excitation elements is a circle centered on a geometric center of the first excitation source.

14. The method according to claim 13, further comprising: responsive to the mobile terminal being in a loudspeaker mode, controlling the first excitation source to generate a third vibration driving force and controlling the second excitation source to generate a fourth vibration driving force, such that at a position where the second excitation source is located, a third vibration wave generated by the third vibration driving force and a fourth vibration wave generated by the fourth vibration driving force have a same vibration direction.

15. A non-transitory computer-readable medium having stored thereon instructions for execution by a processing circuit to perform the method according to claim 13.

16. The non-transitory computer-readable medium according to claim 15, wherein the instructions further comprise performing, responsive to the mobile terminal being in a loudspeaker mode, controlling the first excitation source to generate a third vibration driving force and controlling the second excitation source to generate a fourth vibration driving force, such that at a position where the second excitation source is located, a third vibration wave generated by the third vibration driving force and a fourth vibration wave generated by the fourth vibration driving force have a same vibration direction.

17. A mobile terminal comprising: a housing; a piezoelectric excitation portion disposed inside the housing and comprising a first excitation source and a second excitation source surrounding the first excitation source; a processor; and memory for storing instructions executable by the processor, wherein the processor is configured to perform: responsive to the mobile terminal being in a handset mode, controlling the first excitation source to generate a first vibration driving force and controlling the second excitation source to generate a second vibration driving force, such that at a position where the second excitation source is located, a first vibration wave generated by the first vibration driving force and a second vibration wave generated by the second vibration driving force have opposite vibration directions, and a vibration amplitude of the second vibration wave is less than or equal to that of the first vibration wave wherein the second excitation source comprises a plurality of excitation elements arranged at intervals, and an arrangement trajectory of the plurality of excitation elements is a circle centered on a geometric center of the first excitation source.

18. The mobile terminal according to claim 17, wherein the instructions comprise: responsive to the mobile terminal being in a loudspeaker mode, controlling the first excitation source to generate a third vibration driving force and controlling the second excitation source to generate a fourth vibration driving force, such that at a position where the second excitation source is located, a third vibration wave generated by the third vibration driving force and a fourth vibration wave generated by the fourth vibration driving force have a same vibration direction.

19. The mobile terminal according to claim 18, further comprising a touch screen, wherein the piezoelectric excitation portion is disposed at a side of the touch screen towards an interior of the housing.

\* \* \* \* \*